United States Patent
Muller et al.

(10) Patent No.: US 7,270,793 B2
(45) Date of Patent: Sep. 18, 2007

(54) PROCESS FOR PRODUCING A PHOSPHATE OF THE LANTHANOIDS, AND PHOSPHATE PRODUCED THEREBY

(75) Inventors: Ulrich Muller, Munich (DE); Dieter Schmidt, Unterschleibheim (DE); Martin Zachau, Geltendorf (DE); Franz Zwaschka, Ismaning (DE)

(73) Assignee: Patent-Treuhand-Gesellschaft fuer Elektrische Gluehlampen mbH, Munich (DE)

(*) Notice: Subject to any disclaimer, the term of this patent is extended or adjusted under 35 U.S.C. 154(b) by 274 days.

(21) Appl. No.: 11/012,112

(22) Filed: Dec. 16, 2004

(65) Prior Publication Data
US 2005/0158224 A1 Jul. 21, 2005

(30) Foreign Application Priority Data
Dec. 17, 2003 (DE) .............................. 103 59 550

(51) Int. Cl.
*C01F 17/00* (2006.01)
(52) U.S. Cl. ................................... 423/263
(58) Field of Classification Search .............. 423/263, 423/21.1; 252/301.4, 301.4 P
See application file for complete search history.

(56) References Cited

U.S. PATENT DOCUMENTS

| | | | |
|---|---|---|---|
| 4,423,349 A * | 12/1983 | Nakajima et al. ........... 313/487 |
| 5,091,110 A | 2/1992 | Fan et al. ................. 252/301.4 |
| 5,340,556 A | 8/1994 | Collin et al. |
| 5,415,851 A * | 5/1995 | Kimura et al. .............. 423/263 |
| 5,470,503 A | 11/1995 | Braconnier |
| 5,725,800 A | 3/1998 | Hugeunin ................. 252/301.4 |
| 5,746,944 A | 5/1998 | Braconnier |
| 2003/0232005 A1* | 12/2003 | Okada et al. ............... 423/659 |

FOREIGN PATENT DOCUMENTS

| | | |
|---|---|---|
| EP | 0 685 549 A1 | 12/1995 |
| EP | 0 751 201 A1 | 1/1997 |
| EP | 0 818 416 B1 | 9/2000 |
| EP | 1 108 772 | 6/2001 |

OTHER PUBLICATIONS

*Abstract*, JP 9-296168 (Nov. 18, 1997).

* cited by examiner

*Primary Examiner*—Wayne A. Langel
*Assistant Examiner*—James Fiorito
(74) *Attorney, Agent, or Firm*—Robert F. Clark

(57) ABSTRACT

A process for producing a phosphate of the lanthanoids is described. The process is based on a two-jet precipitation, starting from separate reservoirs of a rare earth salt solution and a phosphate solution which are introduced simultaneously by separate feedlines into an aqueous acidified initial charge with stirring at a pH of $0 \leq pH \leq 1$. After the solutions are added, the pH is raised to a pH of >2 to complete the phosphate precipitation.

9 Claims, 1 Drawing Sheet

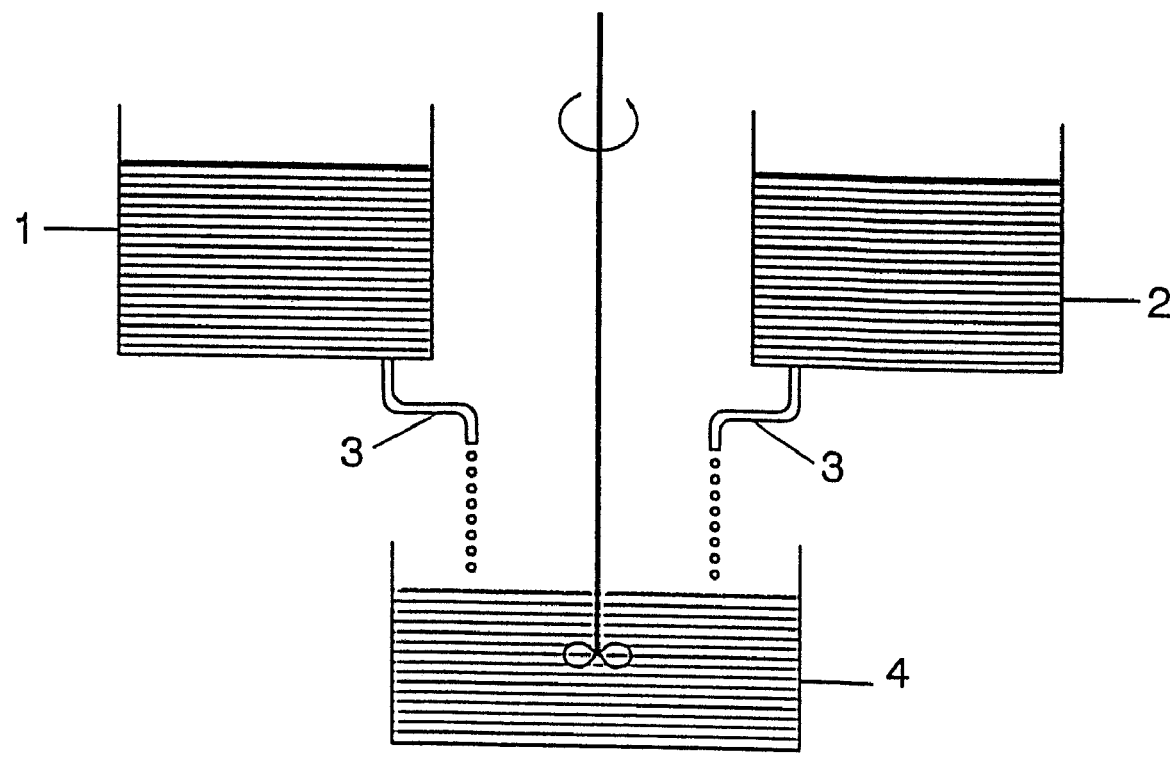

PROCESS FOR PRODUCING A PHOSPHATE OF THE LANTHANOIDS, AND PHOSPHATE PRODUCED THEREBY

TECHNICAL FIELD

The invention relates to a process for producing a phosphate of the lanthanoids and a phosphate produced thereby. It applies in particular to lanthanum phosphate.

BACKGROUND ART

U.S. Pat. No. 5,746,944, U.S. Pat. No. 5,470,503 and U.S. Pat. No. 5,340,556 have already disclosed a process for producing a phosphate of the lanthanoids and a phosphate produced thereby. The processes described in those documents, according to which lanthanum phosphate and phosphates of other rare earths (RE) are precipitated in a filterable form, propose the following steps: acidic solutions of RE salts with phosphoric acid or an aqueous diammonium phosphate solution are reacted with one another at a predetermined temperature and maintaining defined pH values, with a precipitate of RE phosphate with can be successfully be removed by settling being formed under the conditions described. A characteristic feature of processes of this type is the procedure whereby one solution, for example that of the RE nitrates, is introduced continuously and directly into the other solution, for example that of the phosphate, with the pH either always being kept above 2 (U.S. Pat. No. 5,340,556) or always being kept below 2 (U.S. Pat. No. 5,746,944 and U.S. Pat. No. 5,470,503), and indeed according to some regulations even the pH being kept constantly above 4. This procedure is known as "direct precipitation". One application example is the production of green phosphor LaPO4:Ce,Tb from precipitated mixed RE phosphates.

DISCLOSURE OF THE INVENTION

It is an object of the present invention to provide a process for producing phosphate which allows a relatively rapid reaction and a high yield. A further object is to provide a phosphate of this type.

This object is achieved by the following features: a first solution, which contains rare earth salts, and a second solution, which contains phosphate ions, are mixed with stirring at a pH of $0 \leq pH \leq 1$, so that precipitation occurs, and then in a further step the precipitation is concluded by raising the pH to a pH of $>2$.

Particularly advantageous configurations are given in the dependent claims.

The production of green phosphor LnPO4:Ce,Tb with Ln=La or lanthanoid by conventional means, as cited in the introduction, during which ultimately the phosphor is obtained by reacting individual RE oxides with diammonium hydrogen phosphate in a solid-state reaction, has significant drawbacks: on account of an inevitable inhomogeneous distribution of the incorporation of cerium and terbium in the lanthanum phosphate basic lattice, transfer of the excitation energy absorbed by the cerium to the terbium activator ions is impeded, and consequently the maximum achievable luminescence yield is not reached. Furthermore, it is made easier for oxygen to penetrate into the crystal lattice during the oxidizing heating of bulbs during the lamp production process, with the result that the luminescence and thermal stability of the phosphor are additionally reduced. When producing $(La,Ce,Tb)PO_4$ by common precipitation from solutions, it is possible to achieve the maximum possible homogeneity of the compound. Unfortunately, RE phosphate precipitates are generally produced in a slimy form, making it very difficult or even impossible to separate precipitate and mother liquor by filtration. Consequently, a subsequent calcining treatment of the precipitate to obtain the phosphor is not possible under these conditions.

According to the invention, the LaPO4:Ce,Tb is precipitated with a view to developing a precursor product which can easily be filtered in order to produce a highly efficient and stable green phosphor. In this context, it has been found that particularly homogeneous precipitates which can be successfully removed by settling are obtained if an acidic RE salt solution is introduced continuously, at the same time as an acidic diammonium hydrogen phosphate solution, in an approximately equimolar ratio, into an acidified aqueous initial charge ("two-jet precipitation"). Unlike in the case of "direct precipitation", in which one of the reaction partners is fully present in the precipitation vessel in ionic form prior to the precipitation and is only gradually depleted in the suspension in accordance with the addition of the other reaction partner, which means that the first reaction partner is present in excess throughout the entire precipitation, "two-jet precipitation" ensures that neither of the reaction partners is present in significant excess throughout the entire precipitation. On account of the instantaneous formation of the reaction product, free phosphate or RE ions cannot accumulate in the mother liquor, and consequently the precipitation conditions remain virtually constant throughout the entire procedure. It has proven particularly useful for the formation of a precipitate which crystallizes successfully for a small proportion of an alkali metal salt in a concentration of a few ppm to be added to the RE salt solution.

It has been found that the pH of the aqueous initial precipitation charge which is to be set should particularly advantageously be between 0 and 1, and in particular excellent results have been achieved with a pH set at $0.5 \pm 0.1$. In this case, after the two solutions have started to be run in, the well-stirred initial charge first of all becomes slightly cloudy, and this cloudiness increases evermore as the addition of solutions progresses. The pH remains below 1 throughout the entire time that the solutions are being run in. After the addition of the solutions has ended, the pH is slowly increased to 4.5 by dropwise addition of ammonia and the temperature is raised from room temperature (25° C.) to approx. 85° C. While the suspension formed continues to be stirred for about half an hour, the micro-crystallites initially formed grow further to form larger, well-developed crystals with a uniform grain size distribution (this process is generally known as "maturing"), and these crystals can settle out very successfully after the stirrer has been switched off and can then be very successfully removed by filtration. The precipitation reaction in accordance with the process described is complete, i.e. the measured practical yield is 98-100% of the theoretical value.

In addition to alkali metal additives in the RE solution to improve the filtering properties, the addition of magnesium nitrate has also been trialed with positive results: the morphology of the particles, which can be established using SEM images, was even more uniform than when lithium nitrate was used.

The term phosphate in this context normally always means an orthophosphate, where Ln is to be understood as meaning a single one or a combination of a plurality of lanthanoids. In reality, minor deviations from the ideal stoichiometry in the percentage range are customary, for example on account of defects or incomplete conversion.

BRIEF DESCRIPTION OF THE DRAWINGS

The invention is to be explained in more detail below on the basis of a number of exemplary embodiments. In the drawing:

The FIGURE shows an outline illustration of the process.

BEST MODE FOR CARRYING OUT THE INVENTION

Table 1 shows a summary of various processes which have been tested with a view to achieving a maximum yield of phosphate LnPO4. For Ln, it is possible to use Y, Sc, La, Gd, Ce, Tb, Pr, Nd, Sm, Eu, Dy, Ho, Er, Tm, Yb, Lu alone or in combination. The prototype is in particular a phosphor with a typical emission in the green spectral region and having a composition LnPO4:D, where the activator D preferably represents Ce and/or Tb. It is also possible to use all other elements which stand for Ln, although it should of course normally be the case that Ln is different than D.

The first example in Table 1 describes precipitation using a one-jet process, in which the first solution, which contains rare earth salts, is introduced into the second solution, which contains phosphate ions, at a pH of 1 and the two solutions are mixed. The precipitated product obtained proved to be slimy and difficult to filter. By contrast, it is found from the further exemplary embodiments in Table 1 that the two-jet process, in which the first solution, which contains rare earth salts, and the second solution, which contains phosphate ions, are introduced simultaneously and in an approximately equimolar ratio of the precipitated product into an initial charge and are mixed with stirring, is significantly superior to the one-jet process.

It has therefore been found that the two-jet process is far superior to the one-jet process. In particular, the two-jet process can deliberately be used to produce a residue that is compact and easy to filter. Particularly good results are found at an initial pH of between 0.4 and 1, preferably up to 0.8, with the pH being raised to at least 4.4, preferably 4.5 to 5.8, by the end.

During the precipitation, the pH is constantly below 1. The particular advantage of the virtually equimolar two-jet precipitation is that at no time is there a great excess of one of the two precursor materials. The solutions are added dropwise sufficiently slowly for the molar ratio of the rare earth ions and phosphate ions to substantially (preferably deviating by at most 20%) or even exactly correspond to that of the precipitate, and for precipitation then to take place. The precipitation takes place in a quasi-homogeneous solution. The low pH of $\leq 1$ reduces the number of spontaneously forming crystal seeds and therefore allows constant growth of the crystallites which have already formed. Previous processes have virtually inevitably led to a local increase in the pH, which runs contrary to this guideline.

The preferred two-jet process in principle works not only at a pH of below 1 but also above 1, for example at a pH=1.8 to 2. However, it is less suitable for large industrial scale applications.

The FIGURE shows an outline drawing of the two-jet process with a reservoir 1 of RE nitrate solution (contains $RE^{3+}$ ions), to which a precipitation aid, such as Mg nitrate, is preferably also added, and a reservoir 2 of phosphate salt solution (contains $PO_4^{3-}$ ions). The two are slowly added dropwise, for example over the course of several hours, via a feedline 3 to an initial charge in the vessel 4, with mixing being assisted by a stirrer 5. $REPO_4$ is precipitated in the process. Here, RE stands for rare earths, such as La (for Ln) if no activator is used, or also as a combined term for La for Ln and in addition (Ce, Tb) for D if an activator is used.

The mixing of the first and second solutions is preferably carried out at a pH of at most 0.98, particularly preferably at most 0.95. The end of the precipitation is preferably carried out at a pH of at least 4, particularly preferably at least 4.5. By way of example, the increase to the high pH takes place over the course of ten minutes.

In particular the lanthanoid used is a mixture of the elements La, Ce, Tb, Pr, in particular with a cerium and/or praseodymium content of up to 30 mol %. In this context, it is preferable for the cerium content to be between 5 and 30 mol % and the praseodymium content to be between 0.1 and 2 mol %; it is in particular possible for both elements to be used simultaneously.

TABLE 1

| Composition | Starting materials | Type of precipitation | Starting pH | End pH | Filtration |
| --- | --- | --- | --- | --- | --- |
| $La_{0.43}Ce_{0.39}Tb_{0.18}PO_4$ | $H_3PO_4$, $La(NO)_3$, $Ce(NO)_3$, $Tb(NO)_3$, $Li(NO_3$ | One-jet | pH 1 | pH 4.5 | very poor, slimy product |
| $La_{0.99}Pr_{0.01}PO_4$ | $(NH_4)_2HPO_4$, $La(NO)_3$, $Pr(NO)_3$, $Li(NO)_3$, | Two-jet | pH 1 | pH 4.5 | good |
| $La_{0.43}Ce_{0.25}Tb_{0.18}PO_4$ | $(NH_4)_2HPO_4$, $La(NO)_3$, $Ce(NO)_3$, $Tb(NO)_3$, $Li(NO)_3$ | Two-jet | pH 0 | pH 7 | good |
| $La_{0.60}Ce_{0.25}Tb_{0.15}PO_4$ | $(NH_4)_2HPO_4$, $La(NO)_3$, $Ce(NO)_3$, $Tb(NO)_3$, $Li(NO)_3$ | Two-jet | pH 0.5 | pH 0.5 | good |

TABLE 1-continued

| Composition | Starting materials | Type of precipitation | Starting pH | End pH | Filtration |
|---|---|---|---|---|---|
| $La_{0.43}Ce_{0.39}Tb_{0.18}PO_4$ | $(NH_4)_2HPO_4$, $La(NO)_3$, $Ce(NO)_3$, $Tb(NO)_3$, $Mg(NO)_3$ | Two-jet | pH 1 | pH 4.5 | very good, compact |
| $La_{0.43}Ce_{0.39}Tb_{0.18}PO_4$ | $(NH_4)_2HPO_4$, $La(NO)_3$, $Ce(NO)_3$, $Tb(NO)_3$, $Li(NO)_3$ | Two-jet | pH 0 | pH 4.5 | good |
| $La_{0.43}Ce_{0.39}Tb_{0.18}PO_4$ | $(NH_4)_2HPO_4$, $La(NO)_3$, $Ce(NO)_3$, $Tb(NO)_3$, $Mg(NO)_3$ | Two-jet | pH 1 | pH 4.5 | good |
| $La_{0.43}Ce_{0.39}Tb_{0.18}PO_4$ | $(NH_4)_2HPO_4$, $La(NO)_3$, $Ce(NO)_3$, $Tb(NO)_3$, $Mg(NO)_3$ | Two-jet | pH 0.5 | pH 4.5 | very good, compact |

What is claimed is:

1. A process for producing a phosphate of the lanthanoids, comprising the steps of:

simultaneously adding by way of separate feedlines a first solution, which contains rare earth salts, and a second solution, which contains phosphate ions, to a vessel containing an aqueous acidified initial charge with stirring at a pH of $0 \leq pH \leq 1$, so that precipitation of the phosphate occurs at a $pH \leq 1$, the two solutions being added sufficiently slowly in an approximately molar ratio of the ions of the phosphate so that the molar ratio deviates by at most 20% as the precipitation occurs; and concluding the precipitation by raising the pH to a pH of >2.

2. The process as claimed in claim 1, wherein a precipitation aid in the form of an alkali metal salt or alkaline-earth metal salt is added to the first solution.

3. The process as claimed in claim 2, wherein the precipitation aid is a nitrate of lithium or magnesium.

4. The process as claimed in claim 1, wherein the lanthanoid is a single one or a mixture of the elements Y, Sc, La, Ce, Tb, Pr.

5. The process as claimed in claim 4, wherein the lanthanoid is a mixture of the elements La, Ce, Tb, Pr, wherein the cerium and/or praseodymium content is up to 30 mol %.

6. The process as claimed in claim 1, wherein the phosphate has the following composition: $(La_xCe_yTb_z)PO_4$ with $x+y+z = 1$ and with $0.3 \leq x \leq 0.8$; $0.05 \leq z \leq 0.30$.

7. The process as claimed in claim 6, wherein at least one of the following conditions is satisfied:

$0.4 \leq x \leq 0.7$;

$0.1 \leq y \leq 0.5$;

$0.1 \leq z \leq 0.2$.

8. The process as claimed in claim 5, wherein the cerium content is between 5 and 30 mol % and/or the praseodymium content is between 0.1 and 2 mol %.

9. The process as claimed in claim 1, wherein at least one of the following further process steps is then carried out: washing, screening, drying, calcining at a temperature of at least 800° C.

* * * * *